United States Patent
Tourangeau et al.

(10) Patent No.: US 6,623,061 B2
(45) Date of Patent: Sep. 23, 2003

(54) SELF-CONCEALING FLIPPER PANEL

(75) Inventors: James W. Tourangeau, Washington Township, MI (US); Michael V. Harris, Farmington Hills, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 83 days.

(21) Appl. No.: 09/960,863

(22) Filed: Sep. 21, 2001

(65) Prior Publication Data

US 2003/0042749 A1 Mar. 6, 2003

(Under 37 CFR 1.47)

Related U.S. Application Data

(60) Provisional application No. 60/234,104, filed on Sep. 21, 2000.

(51) Int. Cl.[7] .................................................. B60N 2/50
(52) U.S. Cl. .................. 296/63; 296/65.01; 296/65.05; 296/65.13; 297/353; 297/354.1; 297/378.1; 297/383
(58) Field of Search ...................... 296/63, 64, 65.01, 296/65.16, 65.08, 69; 297/353, 354.1, 378.1, 383

(56) References Cited

U.S. PATENT DOCUMENTS

| 3,053,565 | A | * | 9/1962 | Farrow ........................ 296/66 |
| 3,097,881 | A | * | 7/1963 | Aguilar ....................... 296/69 |
| 3,202,453 | A | * | 8/1965 | Richards ..................... 296/66 |
| 4,848,826 | A | * | 7/1989 | Kuwabara et al. ....... 296/65.17 |
| 4,979,772 | A | * | 12/1990 | Carey et al. ................. 296/69 |
| 5,322,335 | A | * | 6/1994 | Niemi ..................... 296/97.23 |
| 5,658,046 | A | * | 8/1997 | Rus .......................... 297/378.1 |
| 6,089,641 | A | * | 7/2000 | Mattarella et al. ....... 296/65.01 |

* cited by examiner

Primary Examiner—D. Glenn Dayoan
Assistant Examiner—Lori L Coletta
(74) Attorney, Agent, or Firm—Foley & Lardner

(57) ABSTRACT

A self-actuating base covering system for a vehicle which includes a foldable seat and a coverable area adjacent a back of the seat includes at least one guide surface along the seat back and a rigid panel. The panel has a first end portion fixed against movement in a horizontal direction and a second opposite end portion in slidable engagement with at least one guide surface. The panel is dimensioned so as to extend at least partially across the coverable area. The second end portion of the panel slides along the at least one engagement surface and the back of the seat during movement of the seat between a lowered position and a raised position.

8 Claims, 4 Drawing Sheets

SELF-CONCEALING FLIPPER PANEL

CROSS-REFERENCE TO RELATED APPLICATIONS

The present application claims priority from U.S. Provisional Application No. 60/234,104, having the same title and filed on Sep. 21, 2000, the full disclosure of which is hereby incorporated by reference.

STATEMENT REGARDING FEDERALLY SPONSORED RESEARCH OR DEVELOPMENT

Not Applicable.

FIELD OF THE INVENTION

The present invention relates generally to trim systems for vehicle interiors. More specifically, the present invention relates to a self-concealing flipper panel used to conceal a gap which exists when a vehicle seat is moved from an upright to a lowered position to extend a cargo floor.

BACKGROUND OF THE INVENTION

In sport utility vehicles, vans and other vehicles, passenger seats can be lowered to expand the cargo floor area when the seats are not needed for passengers. In most SUV applications, the bottom portion of the seat is pivoted about a forward axis, and the seat back is pivoted forwardly so that the top of the seat is adjacent the underside of the seat bottom. In existing designs, a gap results between the existing cargo floor and the resulting rear edge of the seat back when it is in its lowered position. Such gap can result in problems for the owner, for example, items can be dropped into the gap. It would be desirable to have a system in which the gap would be closed, preferably using materials similar to that used to cover the cargo floor. An existing design uses a panel which can be raised up and dropped onto the cargo floor to cover the gap as the seat is lowered. To raise the seat back, the panel must be manually lifted up and then returned to its stored position.

SUMMARY OF THE INVENTION

The present invention provides a self-concealing flipper panel which may be constructed in several different embodiments but which operates automatically and does not need to be touched by the operator during the steps of raising and lowering of the seat back. In a first embodiment, the flipper panel is attached to a fixed anchor on the cargo floor and extends when the seat is lowered. In the second and preferred embodiment, the flipper panel extends toward the floor of the vehicle and flips upwardly to a horizontal position during seat movement.

A feature of the present invention is the elimination of manual handling of the flipper panel during seat raising and lowering. Another feature of the invention is to provide a self-concealing flipper panel which can be matched to the interior trim of the vehicle for aesthetic purposes. A further feature of the present invention is to provide a flipper panel which provides a structural bridge across the gap formed between the cargo floor and the seat when the seat back is in its lowered position. Other features of the invention will become apparent to those skilled in the art after they read this disclosure, which features are also deemed to fall within the scope of the claims which follow.

BRIEF DESCRIPTION OF THE DRAWINGS

The invention will become more fully understood from the following detailed description, taken in conjunction with the accompanying drawings, wherein like reference numerals refer to like parts, and in which.

DETAILED DESCRIPTION OF THE PREFERRED AND ALTERNATE EMBODIMENTS

Figure 1:
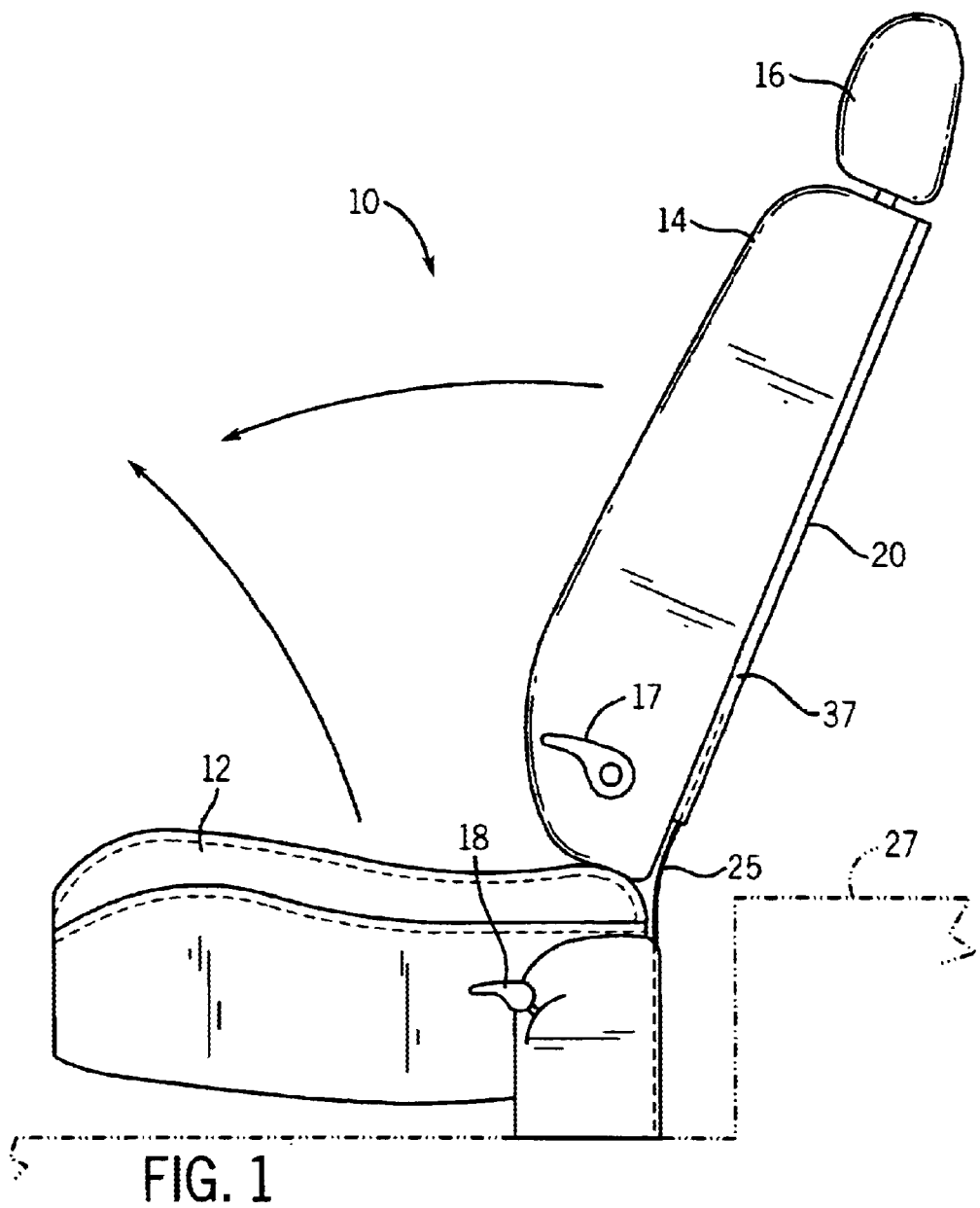
FIG. 1 is a side view of a car seat showing manipulation handles and showing the direction of movement for the seat bottom and the seat back.

Referring to FIG. 1, a seat 10, such as is commonly used in SUV's is illustrated. Seat 10 includes a bottom 12 and a seat back 14. A headrest 16 is also shown in this figure.

FIG. 1 also illustrates activating mechanisms 17 and 18 which are used for the storage of seat 10. As illustrated by the arrows, activation of mechanism 18 will allow the forward pivoting of the seat bottom 12, and activation of mechanism 17 will allow seat back 14 to be rotated forwardly and downwardly.

Figure 2:
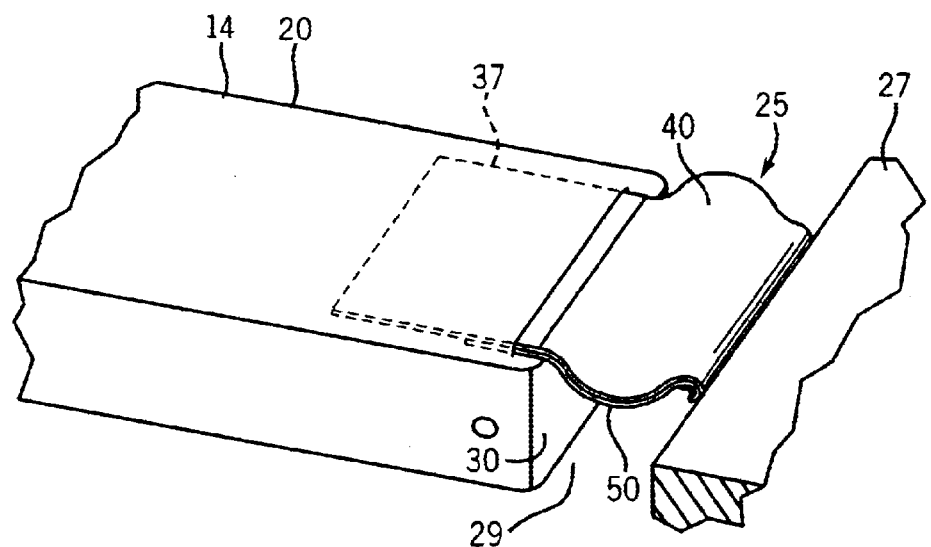
FIG. 2 is a view showing the lower portion of the seat back and the flipper panel in its horizontal position bridging a gap between a cargo floor and the rear edge of a seat.

The self-concealing flipper panel system of the present invention is shown generally at 25 in FIG. 1 and will be illustrated in greater detail by reference to FIGS. 2–4 below. FIG. 2 illustrates the self-concealing flipper panel system 25 in greater detail. FIG. 2 illustrates the seat back 14 in the horizontal position and a cargo floor 27. A gap 29 exists between the cargo floor and the rear portion 30 of the folded down seat back 14. In the present invention, a self-concealing flipper panel system 25 substantially covers the gap 29 and prevents objects from falling therein. System 25 also provides a smooth transition between the cargo floor 27 and the rear surface 20 of seat back 14. FIG. 2 also shows in dotted line a pocket 37 formed in rear surface 20 of seat back 14 which is adapted to receive a plastic sheet as will be more apparent from the following description.

Figure 3:
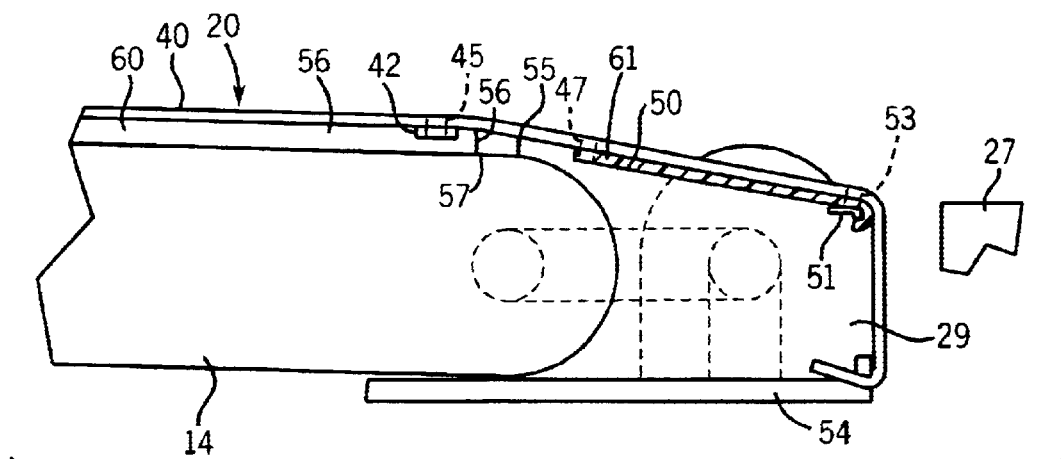
FIG. 3 is a sectional view showing the main components of the self-concealing flipper panel, the flipper panel being in the extended position as shown in FIG. 2.
Figure 4:
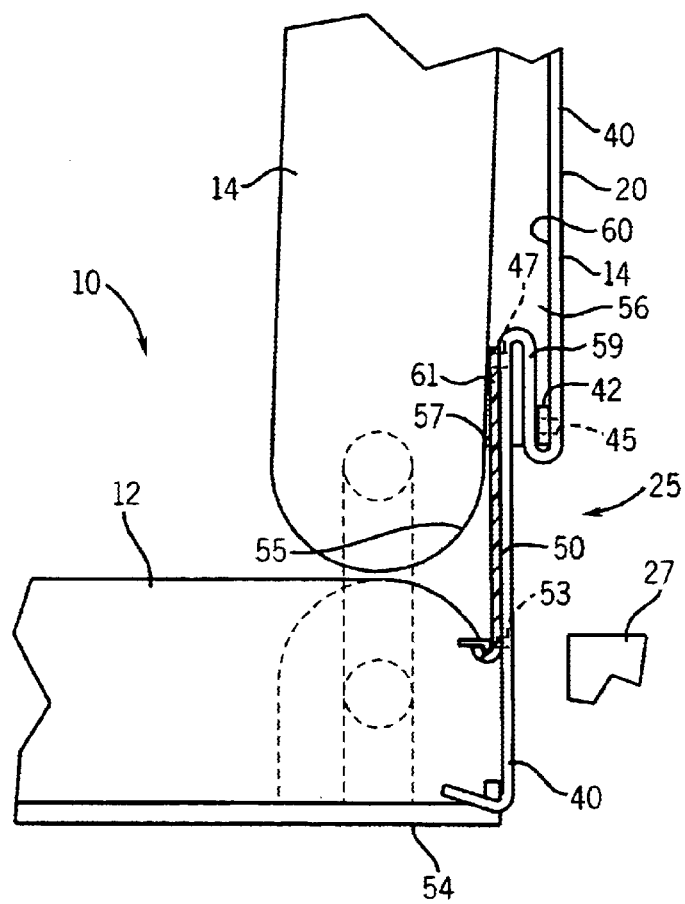
FIG. 4 is a side view of an alternative embodiment showing the flipper panel in its stored position.

Referring next to FIGS. 3 and 4, the major components of the self-concealing flipper panel system 25 are shown. It should be recognized that the distances between certain components are exaggerated for purposes of more clearly explaining the invention. Rear surface 20 of seat back 14 includes a panel of seat back material 40. At a lower portion of seat back 14, a reinforcement strip 42 is sewn across the width of seat back material 40 for purposes which will soon become apparent. Material 40 preferably comprises a somewhat flexible material such as a carpet with a relatively stiff backing. An example is an eight to fourteen ounce random velour carpet. Preferably, a 10 ounce random velour carpet is chosen. The strip 42 is attached to seat back material 40 by a stitching line 45 represented in the figures by the parallel lines 45. Located below the reinforcement strip 42 is another stitch line 47 which connects the seat back material to a thin sheet of substantially rigid plastic sheet or panel 50. Plastic sheet 50 is also stitched to seat back material 40 as indicated by stitching line 53. Sheet 50 is preferably anchored by anchor 51 to a stationary structure such as the vehicle floor or cargo floor. A J-retainer is shown as an example of one such anchoring means which may be utilized. As shown by FIG. 2, seat back material 40 preferably extends about an end of panel 50. In the exemplary embodiment, material 40 is anchored to a floor or other base structure 54 of the vehicle.

Two additional components are involved in the self-concealing flipper panel system 25:, namely a lower cover 55 which is attached to the seat support structure and a guide sleeve 56 which is attached by sewing 57 to the lower cover 55 and to the opposed sides of the seat back material 40. Guide sleeve 56 provides a guide surface for guiding the movement of panel 50 along seat 14. Alternatively, the guide surface may be provided by other structures such as a pair of inwardly facing fingers on opposite sides of panel 50. In combination, the guide sleeve 56 and the seat back material 40 form an open pocket or passageway 60 which receives the plastic sheet 50 during functioning of the self-concealing flipper panel system 25.

Proceeding now to an explanation of the operation of system 25, it will first be noted in FIG. 4 that the plastic sheeting 50 is inserted and located in passageway 60 between seat back material 40 and guide sleeve 56. When the seat back 14 is lowered to its horizontal position, the fold 59 which exists between stitching lines 45 and 47 is tensioned, causing the plastic sheet 50 and seat back material to flip upwardly to a horizontal position as shown in FIG. 3. As can be seen in FIG. 3, the tip of the resulting flipper panel closely adjoins the forward surface of cargo floor 27 and extends over gap 29 which is created when seat back 14 is pivoted to the lowered position.

It will also be apparent that as the seat is returned to a vertical position, forces are exerted on the plastic sheet 50 urging the plastic to move to the left relative to the seat back 14 as shown in FIG. 3, and to assume a stored position as illustrated in FIG. 4. In particular, panel 50 pivots with seat back 14 and end portion 61 slides further into pocket 60. At the same time, the portion of material 40 between connecting points 45 and 47 folds (in part due to strip 45) and is carried by panel 50 into pocket 60. As a result, gap 29 remains covered despite movement of seat back 14. Such movement of panel 50 and the overlying material 40 results without the need for the operator to touch the self-concealing flipper panel system 25.

With regard to the materials to be used herein, the lower cover is typically formed of the same material as the seat back material, while the guide sleeve can be made from a less expensive material, such as non-woven fabrics. Its function is primarily to isolate the movement of the plastic sheet 50 from internal seat back mechanisms. The plastic panel 50 preferably comprises a 2 mm member of polypropylene. Alternatively, the plastic panel can be replaced by a metal sheet or a particle board sheet. Moreover, although a sheet or panel configuration is preferred, other non-planar members may also be employed. Although stitches are disclosed for connecting various components, other conventionally known and future developed fastening means and mechanisms may alternatively by utilized.

Figure 5A:
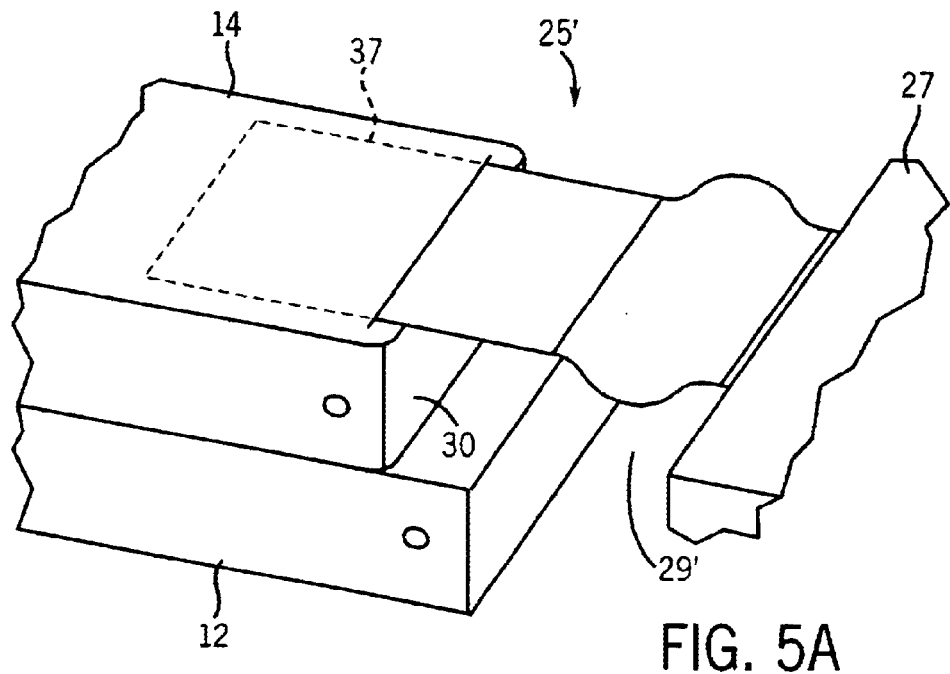
FIG. 5A is a perspective view of an alternative embodiment illustrating a portion of a seat back and showing a flipper panel anchored to a cargo floor while the seat back is in a lowered position.
Figure 5B:
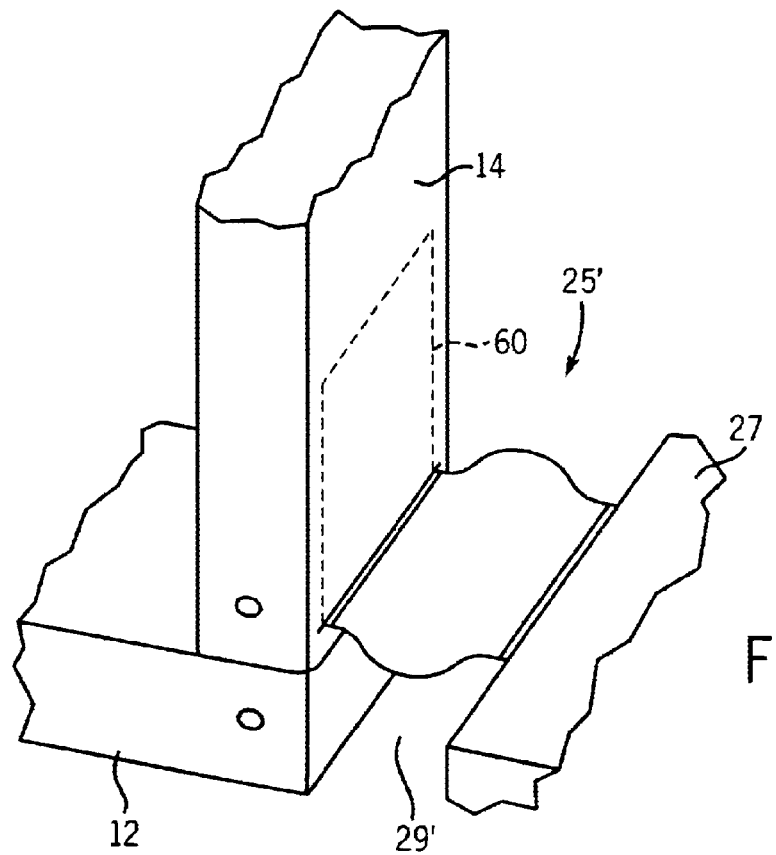
FIG. 5B is a perspective view of a portion of a seat back and showing a flipper panel anchored to a cargo floor while the seat back is in a raised position.

FIGS. 5A and 5B illustrate an alternative embodiment of the system shown in FIGS. 1–4. FIG. 5A illustrates self-concealing flipper panel system 25' while seat back 14 is in a lower position. FIG. 5B illustrates system 25' while seat back 14 is in a raised position. In lieu of panel 50, system 25' includes panel 60 formed from a resilient material and secured within pocket 37, so as to be resiliently biased towards the interior of pocket 37. Other techniques may be applied to insure that the panel or material fold is returned to the pocket in the rear surface 20 of seat back 14, such as the use of elastic strips within the seat back pocket to pull excess material into the pocket when the seat is in the vertical position. The outermost portion of the panel 60 is anchored to cargo floor 27, such that movement of the seat back 14 in the direction indicated by the arrow will cause the stored fold of material held within the pocket 37 to extend over gap 29'. It will be returned to the pocket 37 when the seat is again raised to a vertical position. The panel 60 may be attached to the cargo floor using any type of suitable fastener including snap fasteners, hook and loop fasteners (VELCRO®) and the like.

While the embodiments of the invention illustrated in the FIGS. and described above are presently preferred, it should be understood that they are offered by way of example only. Accordingly, the present invention is not limited to a particular embodiment, but extends to various modifications that nevertheless fall within the scope of the appended claims.

What is claimed is:

1. A self-concealing flipper panel system for a vehicle which includes a cargo floor and a foldable seat back, a gap being present between the seat back and cargo floor when the seat back is in a lowered position, the system comprising:

a guide sleeve defining a pocket within the seat back;

a flipper panel including a substantially rigid sheet and a covering, the flipper panel being arranged to move into the pocket when the seat back is raised and to extend from the pocket and flip to a horizontal position when the seat back is lowered.

2. The system of claim 1 wherein the rigid sheet is a plastic sheet sewn to the covering at a first sewn area.

3. The system of claim 2 wherein a reinforcing strip is sewn across the seat back at a lower end of the pocket at a second sewn area, wherein a strip of the covering is created between the first and second sewn areas, the strip of the covering substantially residing in the pocket when the seat back is raised.

4. The system of claim 1 further including a lower cover attached to the seat and to the guide sleeve.

5. The system of claim 1 wherein the flipper panel is anchored to the cargo floor.

6. A self-actuating covering system for a vehicle which includes a foldable seat and coverable area adjacent a back of the seat, the system comprising:

at least one guide surface along the seat back; and a panel having a first end portion fixed against movement in a horizontal direction and a second opposite end portion in slidable engagement with the at least one guide surface and dimensioned so as to extend at least partially across a space adjacent the seat when the seat is folded downward, wherein the second end portion of the panel slides along the at least one engagement surface and the back of the seat during movement of the seat between a lowered position and a raised position.

7. The system of claim 6 including a covering extending across the panel.

8. The system of claim 7, wherein a portion of the covering moves between an extended position when the seat is in the lowered position and a folded position when the seat is in the raised position.

* * * * *